United States Patent [19]

Lee

[11] 4,354,348

[45] Oct. 19, 1982

[54] SOLAR SPACE VEHICLE

[76] Inventor: Robert E. Lee, 479 Dean St., Brooklyn, N.Y. 11217

[21] Appl. No.: 850,974

[22] Filed: Nov. 14, 1977

[51] Int. Cl.³ .................. F03G 7/02; F02K 11/00
[52] U.S. Cl. .................. 60/203.1; 60/641.15; 126/440; 244/62; 244/172
[58] Field of Search .............. 60/641, 203; 126/271, 126/440; 244/62, 172

[56] References Cited

U.S. PATENT DOCUMENTS

| | | | |
|---|---|---|---|
| 1,599,481 | 9/1926 | Marcuse | 126/271 |
| 3,064,418 | 11/1962 | Sanders | 60/203 |
| 3,064,418 | 11/1962 | Sanders | 60/203 |
| 3,152,260 | 10/1964 | Cummings | 60/641 |
| 3,680,307 | 8/1972 | Michalec | 60/641 |
| 3,825,211 | 7/1974 | Minovitch | 60/203 |
| 3,965,683 | 6/1976 | Dix | 126/271 X |
| 3,987,780 | 10/1976 | Nozik | 126/271 |
| 4,043,315 | 8/1977 | Cooper | 126/271 X |
| 4,056,093 | 11/1977 | Barger | 126/440 X |
| 4,057,048 | 11/1977 | Maine | 126/440 |
| 4,068,474 | 1/1978 | Dimitroff | 60/641 |
| 4,136,670 | 1/1979 | Davis | 126/271 |

*Primary Examiner*—Allen M. Ostrager

[57] ABSTRACT

This invention relates to space vehicle where solar energy is used to generate steam, which in turn, propels the vehicle in space. A copper boiler is provided and a novel solar radiation condensing means is used to focus the sunlight on said boiler. Steam generated in said boiler is exhausted to the environment to provide a thrust for the vehicle.

1 Claim, 3 Drawing Figures

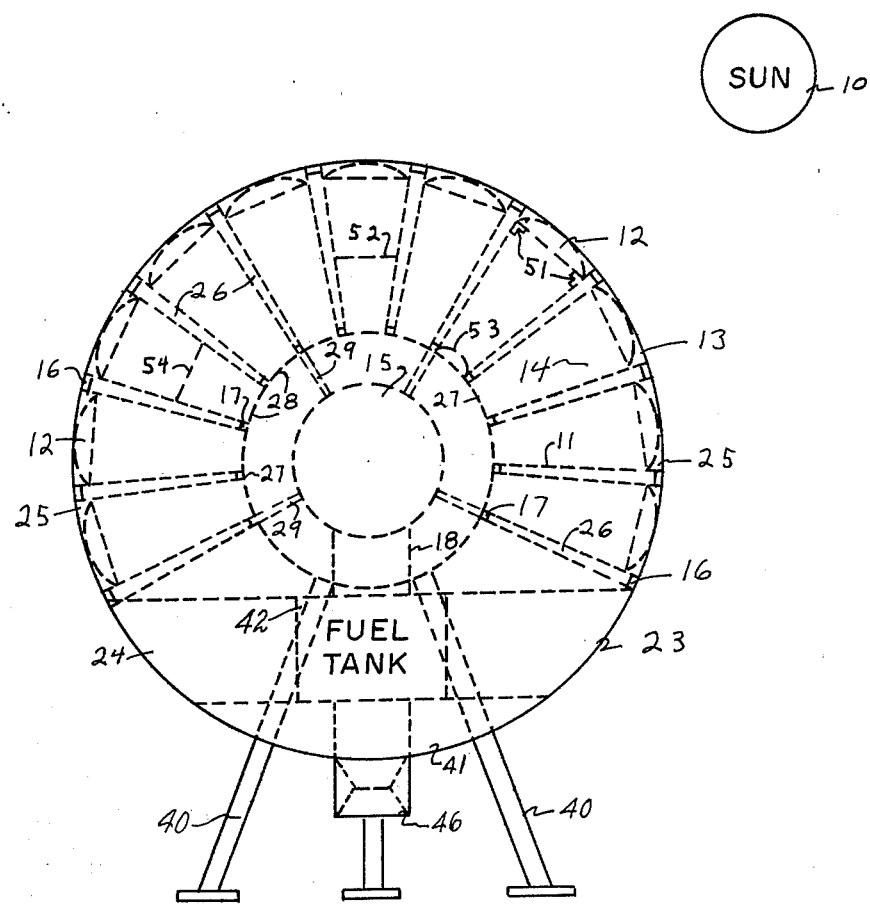

SOLAR SPACE VEHICLE

This invention relates to a solar space vehicle and means to effect a thrust to propel the vehicle in air, outer space, and for other various vehicles and uses. An object of this invention is a provision of a means of transportation in the air to all parts of the world.

This application is related to patent application—titled Solar Hydrogen Engine, Ser. No. 697,213, filed Aug. 13, 1976, now abandoned.

A further object of this invention is to provide a means for traversing long distances without refueling.

The invention has also for its object to provide a military vehicle for whatever purpose it may be required.

Still additional benefits and advantages of this invention will become evident from a study of the following detailed description taken in conjunction with the accompanying drawings in which:

FIG. 1 is an aft end sectional in part view showing tubes radially positioned around the boiler tank with lenses mounted in the tubes in dash line representation.

FIG. 2 is a top plan view of the invention showing the lenses suitably secured to the skin, or fuselage of the vehicle.

FIG. 3 is a side sectional view of the vehicle showing the boiler tank, fuel tanks, passenger and control compartments.

Describing the invention more in detail in its broader aspects, the said invention comprises a vehicle of several shapes and sizes but shown here with a spherical fuselage, consisting of a suitable perforated titanium skin 13 which permits apertures 25 to allow solar radiation 10 to steam boiler tank 15.

Preferably the space vehicle skin structure 13 is made of titanium or an alloy of titanium to provide a strong and stable support for the vehicle at various speeds. Latitude ring ribs 16 arrranged and secured within the sphere vehicle support the fuselage. Angularly positioned conical tubes or pipe supports 26 are welded to latitude ring ribs 16 and inside ring ribs 17 which are welded to inside encasement 27. Supports 29 secured in selected angular positions are welded to inside encasement 27 and are suitably secured to the copper tank 15 by welding or other means, and serve to help stabilize the entire structure of the vehicle. Transverse ribs 39 and support plate 38, and circular bulkhead 36 are welded together and provide transverse and vertical support for the vehicle and also form control and passenger compartments 24 and 23. Deck plate 37 is welded to circular bulkhead 36, ribs 16, and support legs 40, which also partitions and forms, and arranges fuel tanks 41 and 42. Nitrogen from tank 31 pressurizes expandable bladders 32 and 33 to force the fuel through inlets 43 and 44 into the pump 35 and through pipe 34 to the boiler. The fuel is preheated by the combustion tube 45 which is made applicable to suitably transfer heat by convection to the fuel.

The fuel is preferably steam or an alkali metal for the propellant. The water or alkali metal is heated to a vapor in the boiler tank 15. The expanded gases effect the thrust of the vehicle and exchanges momentum with the environment to produce the lift of the vehicle. The control units for the fuel control and navigation control panels and other equipment are shown in enclosures 47 and 48. Wings, rudder, ailerons, and other aerodynamic parts are not shown on the vehicle.

Solar radiation 10 passes through lenses 12 which are secured by brackets 51 to the tube means 14. The solar radiation strikes the sides of the tapered tubes and then passes to the boiler tank 15 to heat the fuel in the said tank 15. Tube means 14 angularly disposed within the fuselage 13 and the enside encasement 27, and suitably aligned to focus the radiation on the boiler tank give up electrons to the radiation stream. The inside at 11 of the tapered tubes 14 are coated with a suitable metal that gives electrons to the said radiation stream. The said metal may be tourmaline gem stone granules with a suitable cement. Other semiconductor materials and arrangements may be used. Platinum nickel screens 52 may be secured in the tubes 14 as a thermo-couple to supply some electric current for the vehicle. Tubes 14 may be modified and used as a vacuum tube with a quartz lens or window at 53 to transfer the emitted radiation to the boiler tank 15. Also an emulsion liquid or gelatin may be used in the said tubes, such as potassium chromium tartrate which will transfer more electrons through the quartz window 53 to heat the boiler tank 15. Sulfuric acid mixed with sodium chloride will also produce more radiation for the radiation stream. A section of each tube is modified with an aperture to slide in the fluid container and also making allowances for the expansion of the liquid including a pressure release means.

Further modifications could permit a gas to be used in the tubes in which each tube would be modified to contain a suitable gas to transfer the radiation to the boiler tank. Sodium vapor could be used with silicon coated on the inside of the tubes. Many modifications and arrangements could be made to improve the radiation stream. The said tubes 14 can also be modified by sliding or turning two tubes, one within the other, to provide focusing adjustment for the radiation stream. Preferably a telephoto lens system is used to condense the radiation on the target or boiler tank or other associated arrangement to suitably focus the radiation on the said target or tank 15. The stated modifications are not shown but are applicable to this invention.

Solar radiation 10 or other radiation passes through the transparent lenses 12 and through the tubes 14 which are coated with a material that gives up electrons or other particles to the radiation stream which passes through aperture 28 to the target or boiler tank 15.

A butterfly type damper valve or a shutte means to control the amount of radiation to the target or boiler 15 should be used in each tube and is shown in dashed line representation at 54. In this invention the lenses and tubes are illustrated as being suitably focused on the copper tank 15. Water or an alkali metal from fuel tanks 41 and 42 are forced into the boiler tank 15 by expandable pressure bladders 32 and 33 which are pressurized by nitrogen pressure from nitrogen tank 31. The fuel is forced from the said tanks 41 and 42 and through pipes 43 and 44 to the pump 35, which assists the bladders 32 and 33 and pumps the fuel to the boiler tank 15. The fuel is heated to a vapor in the boiler tank 15. The expanded gases are forced out pipe channel 30 to thrust channel 45 and out convergent-divergent nozzle 46. Preferably the vehicle is an air breather with a suitable compressor to compress the gases to effect a suitable thrust and effect the lift of the said vehicle in proportion to the size of the craft. The air ducts for the air and the compressor arrangement are not shown but are necessary to provide an effective thrust.

Lenses 12 may be facetted to focus more radiation on the target or boiler 15. The facets are shown at 55.

Boiler tank 15 may be modified in construction by securing a section of zinc metal over one forth part of the lower half of the copper tank 15 which would supply some electric current to the battery or other selected equipment. One door is shown at 49 and one window at 50. Pivotable wings for vertical and horizontal flights are necessary for effective flight of the space vehicle, in which the mechanics of pivotable wings are known, and not shown herein. Thrust tube 45 is also secured in the horizontal position for the horizontal flight but not shown in the drawings.

This invention, solar space vehicle, may be modified for use on sea-going ships, water craft, road vehicles and other uses. With many possible configurations, and while this invention is described and illustrated herein, it is not proposed that this invention be limited to the exact details of construction herein shown in the drawings and described in the specification and that reservations of the rights in practice are made, to the end that any necessary changes and modifications may be made therein, which may come within the scope of this invention.

What I claim is:
1. A space vehicle comprising:
    a. a large diameter outer sphere;
    b. a smaller diameter spherical copper boiler located inside and at the approximate center of said outer sphere;
    c. means for delivering water to the interior of said copper boiler;
    d. means for exposing said copper boiler to solar radiation and to a flow of electrical charges whereby steam is generated, in said boiler;
    e. means for delivering said generated steam from the boiler to the environment outside the outer sphere to thereby provide a thrust component and hence a propulsion force for the vehicle;
    f. said means for exposing the boiler to solar radiation and said flow of electrical charges including;
        1. tapered cones mounted about the entire periphery of the copper boiler,
        2. said tapered cones having their narrow ends adjacent said boiler and their wider ends eminating to openings in the outer sphere,
        3. lenses mounted in the wider ends of the tapered cones substantially contiguous with the outer surface of the outer sphere,
        4. tourmaline gem stones lining the side walls of said cones whereby a piezoelectric effect is generated upon solar energy impinging on the side walls of the cones.

* * * * *